United States Patent [19]
Levy

[11] Patent Number: 5,944,790
[45] Date of Patent: Aug. 31, 1999

[54] METHOD AND APPARATUS FOR PROVIDING A WEB SITE HAVING A HOME PAGE THAT AUTOMATICALLY ADAPTS TO USER LANGUAGE AND CUSTOMS

[75] Inventor: Daniel Richard Levy, Lisle, Ill.

[73] Assignee: Lucent Technologies Inc., Murray Hill, N.J.

[21] Appl. No.: 08/684,120

[22] Filed: Jul. 19, 1996

[51] Int. Cl.[6] .............................. G06F 13/38; G06F 15/17
[52] U.S. Cl. ........................................... 709/218; 709/228
[58] Field of Search ...................... 395/200.33, 200.49, 395/200.76, 200.48, 200.59; 709/203, 219, 246, 218, 229, 228

[56] References Cited

U.S. PATENT DOCUMENTS

| 5,442,749 | 8/1995 | Northcutt et al. | 395/200.49 |
|---|---|---|---|
| 5,557,541 | 9/1996 | Schulhof et al. | 395/200.49 |
| 5,583,761 | 12/1996 | Chou | 395/200.49 |
| 5,619,425 | 4/1997 | Funahashi et al. | 395/200.33 |
| 5,715,453 | 2/1998 | Stewart | 395/200.48 |
| 5,727,156 | 3/1998 | Herr-Hoyman et al. | 395/200.49 |

OTHER PUBLICATIONS

Anonymous, "Internet access: Globalink to provide Netscape clients with on-line language translation; Internet to become truly international and multilingual", EDGE: Working–Group Computing Report, p. 17, Sep. 25, 1995.

Anonymous, "Hitext of Belgium: localizing software for multilingual environments"; Seybold Report on Publishing Systems, p. 18, Jan. 30, 1995.

*Primary Examiner*—Mark H. Rinehart
*Attorney, Agent, or Firm*—Jack R. Penrod

[57] ABSTRACT

In order to make the world wide web truly world wide, a method and apparatus is provided such that accesses to a world wide web home page can be responded to with a home page adapted to the language or dialect that is most likely to to match the native language or dialect of the user. To provide this, the user's country code, numerical node address, or the user's client system address is matched in a database to provide the most likely language. Other languages may be selected if the choice is incorrect and the database will remember that selection for future accesses. Further, since some data transmissions are regulated by national law, the user and client location information is used by the server to prevent the server or the client from violating their respective national laws.

32 Claims, 5 Drawing Sheets

METHOD AND APPARATUS FOR PROVIDING A WEB SITE HAVING A HOME PAGE THAT AUTOMATICALLY ADAPTS TO USER LANGUAGE AND CUSTOMS

BACKGROUND OF THE INVENTION

The present invention relates to data communications between computer systems and more particularly to TCP/IP data communications using a special type of telnet communication on the Internet known as hypertext transmission protocol (http).

DESCRIPTION OF THE PRIOR ART

The Internet is a world wide communication network. At the communication link level, it uses TCP/IP protocol and standard data encoding techniques to send data to and from its final destinations. Thus, at the lowest level there is universal agreement on how to transmit and receive information, and computer-to-computer communications are all in a basic universal language.

Unfortunately, the users of this basic language don't often speak or read in binary ones and zeroes, nor do they think and write in uniform length packets. Thus, the universal language almost always encodes some other symbols or images which typically are not in universal languages. Thus, information received over the Internet that contains words often is only readily intelligible to those users who can understand the language and dialect, hereinafter referred to collectively as languages, in which the words are written or spoken. Thus, the world wide scope of the Internet is diminished somewhat by the fact that the ultimate users speak and read languages that are less than universal.

Nowhere is this language barrier more of a problem than on the World Wide Web. The World Wide Web is a special anonymous form of telnet communication. The World Wide Web, with the initial screen displays of each web site, often contain hyperlinks to related data. The related data are almost always in one language or another. But that means the initial page, commonly known as a 'home page' is unintelligible to users in the world who are not familiar with that particular language.

Some home pages recognize this limitation and have alternative home pages in other languages. For example, Netscape, Nua and a Japanese Patent Service all have home pages where each user may interactively select from equivalent home pages that have text in the selected language.

Because of home page design, the interactive links to equivalent home pages in other languages are difficult to find. This is because the designers want appealing and interesting home pages, which often advertise products and services of the home page owners. In their desire to develop a readily appealing home pages, designers give little thought to helping users who have a different native language. Therefore, in an attempt to readily grab the interest of local users that are potential consumers of the products and/or services of the web site owner, other potential consumers who use a different language have their interest and understanding hindered. Thus, it is desirable to have a site on the World Wide Web which is intelligible by users of all languages.

In addition to language differences between the various nations of the world, there are differences in laws also. Some data file transfers would constitute an export of technology, which requires governmental approval in some cases and is strictly forbidden in others. The legality of the subject matter, especially so called adult subject matter, of some graphics or text files varies from nation to nation and culture to culture. Thus, it is desirable to have a site on the World Wide Web which can be programmed to automatically protect the site owner and the user from violating their respective national laws.

It is an object of the present invention to provide an internet computer service that can respond to an internet client and the user operating that client in a language or dialect that corresponds to the location of the client.

It is another object of the present invention to provide an internet computer service that responds to an internet user in a language or dialect that corresponds to a location of the node address of the user.

It is another object of the present invention to provide an internet service that conforms automatically to the export laws of the nation in which the server is located.

It is another object of the present invention to provide an internet service that conforms to the laws of the nation that corresponds to the location of the user.

SUMMARY OF THE INVENTION

Briefly stated, in accordance with one aspect of the invention, the foregoing objects are achieved by providing a virtual World Wide Web (WWW) page system which automatically and intelligently adapts its main language and a set of links to alternative versions in alternative languages or dialects based upon accessing location as deduced from a client's domain and also possibily sub-domain. The domain and sub-domain information may further be conjoined with previous usage patterns of each user of each client.

In accordance with another aspect of the invention, the aforementioned objects are achieved by providing a computer system having a data communications interface connected to the internet and operating as a server. The computer system includes storage means for storing a plurality of initial displays of said server, with each of said plurality of initial displays being in one of a plurality of languages. The computer system further includes means for reading a location code from each user's domain designation, and means for selecting an initial display of said plurality of initial displays that is in one of said plurality of languages that corresponds to the dominant language for the location indicated by the location code from each client's domain designation.

In accordance with another aspect of the invention, the aforementioned objects are achieved by providing a computer system having a data communications interface connected to the internet and operating as a server. The computer system includes storage means for storing a plurality of sets of displays linked to an initial display of said server, with each of said plurality of display sets being in one of a plurality of languages. The computer system further includes means for determining a location from each user's address, and means for selecting an initial display of said plurality of display sets that is in one of said plurality of languages that corresponds to the dominant language for the location indicated by the location code from each client's address.

In accordance with another aspect of the invention, the aforementioned objects are achieved by providing a computer system having a data communications interface connected to the internet and operating as a server. The computer system includes storage means for storing a plurality of sets of displays of said server, with each of said purality of display sets being in one of a plurality of languages. The computer system further includes means for reading a location code from each user's address, and means for selecting an initial display of said plurality of display sets that is in one of said plurality of languages that corresponds to the dominant language for the location indicated by the client's address, wherein each of said plurality of display sets is varied in appearance and content to comport with the laws and customs of the nation in which each client is located.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

Figure 1:
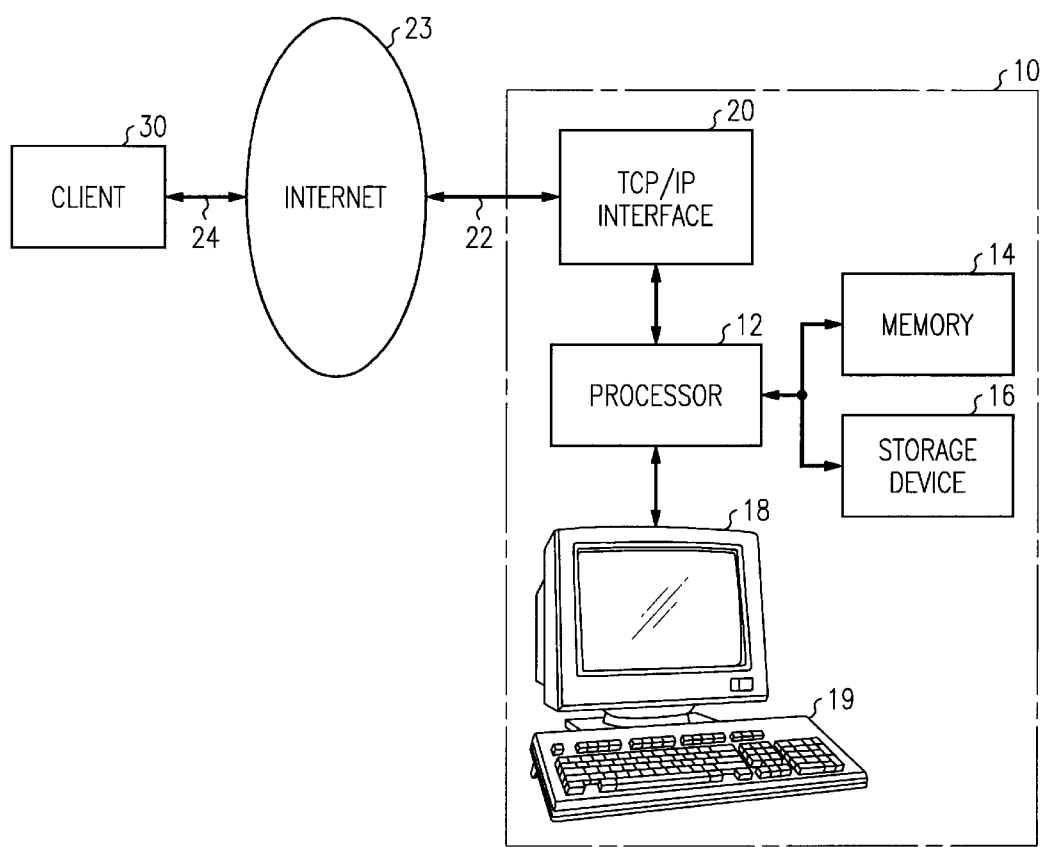
FIG. 1 shows a block diagram of a computer system that operates as a world wide web server.

Referring now to FIG. 1, a computer system 10 operating as an internet server is shown. Computer system 10 has a processor 12 and a memory 14, which typically contains both read only memory devices and random access (read/write) memory devices, connected to the processor 12. Computer system 10 also has a storage device 16, such as a hard disk drive connected to the processor 12. The storage device 16 stores instructions and numerical values which are read in either to the processor 12 directly or read into the processor 12 after being stored in memory 14. Some of the instructions and numerical values are the programs and data necessary to operate an internet server. Additionally, computer system 10 may have a visual display 18 and a keyboard 19 for set-up and maintenance purposes, but when set up, computer system 10 does not require the operation of visual display 18 or keyboard 19 to function as an internet server.

The computer system 10 further has an interface 20 which is connected on one side thereof to the processor 12 and on another side thereof is connected to a line 22 connected to the internet network 23. Interface 20 terminates line 22 and operates as a data and protocol converter between the internal data communications of processor 12, memory 14 and storage device 16, and the TCP/IP protocol of line 22 and the network 23 to which it is connected.

The Internet network 23 is a collection of communication paths and nodes which are used to pass data from clients to servers and back. A representative client 30 is shown in FIG. 1 as being connected to the Internet network 23 by line 24. The client 30 may be very similar to the server 10 in overall arrangement and components, or it may be one of the somewhat simpler Internet appliances. Such Internet appliances may be highly sophisticated telephones, advanced game machines or world wide web browsing televisions. The present invention applies to any type of client that the user is using.

Figure 2:
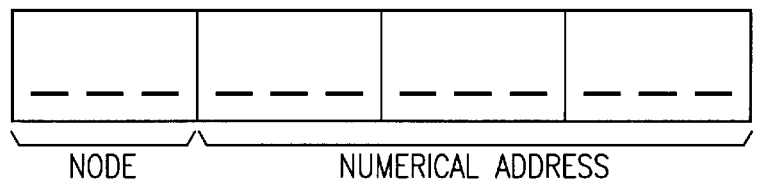
FIG. 2 shows a client's node numerical style address.
Figure 3:
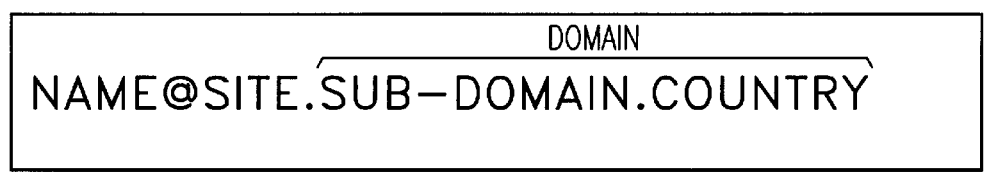
FIG. 3 shows a client's designation and domain style address.

The present invention utilizes the address of the server 10 and the address of the client 30. Referring now to FIGS. 2 and 3, the two more common techniques of addressing are shown. The first addressing technique, which is shown in FIG. 2, uses the IP node address. This technique involves the use of a numerical address which presently consists of a concatenation of four numbers, each up to three digits in length, but this may be enlarged in the future to accommodate more users and the present invention will still apply. Each numerical address uniquely identifies the node at which the communications either begin or end. As will be explained below, this is the lowest level and all point-to-point internet communications ultimately use numerical addresses.

The second addressing technique, which is shown in FIG. 3, uses a verbal address. The verbal address is typically of the form name@domain. In this form, the name portion is typically the name or initials of the user or server. For common names, often numbers are added to differentiate between the John Smiths of the world. The domain portion indicates the category of the address (in a sub-domain portion) and usually country code. For example: commercial clients and servers are located in the ".com" sub-domain, clients and servers of educational Institutions are located in the ".edu" sub-domain and governmental clients and servers are located in the ".gov" sub-domain. Each of the sub-domains may be accompanied by another type of sub-domain called a "site" which usually is a form of the name of the entity having that address. If it is a company name, it is frequently its logo, if it is an educational institution it is often its initials, and if it is a govenmental entity its subdomain is typically an abbreviation of its department. To avoid confusion and duplication, national and international associations register these verbal addresses of the name@domain type, normally on a first come-first served basis, but some deference is given to owners of registered trademarks.

Verbal addresses of the name@domain form often include a designation called a country codes, such as ".uk" for the United Kingdom and ".fr" for France. The major exception to that rule is the United States, which typically has no country code, primarily because the Internet originally was started by the United States Defense Department and originally all addresses at that time were within the United States. INTERNIC registers most name@domain addresses in the United States. If the client or server uses the ".us" country code, however, such registration is not required.

Verbal addresses are just aliases for numerical addresses. For routing purposes, the name@domain addresses are converted to numerical addresses using a domain name server (DNS).

In world wide web (i.e. http) communications, the verbal address form shown in FIG. 3 represents a subset of a more general class of address forms referred to as uniform resource locators (URLs). The URL form is more general because the "name" portion of a URL can be a file name as well as a user/client name or a server and/or logical server name. If the "name" and "@" portions of an address are left off completely and only the site and domain (including country code if any) portions are used in a world wide web access, the server being accessed interprets this as a request to access its top most world wide web page. This top most page is commonly referred to as a home page.

Figure 4:
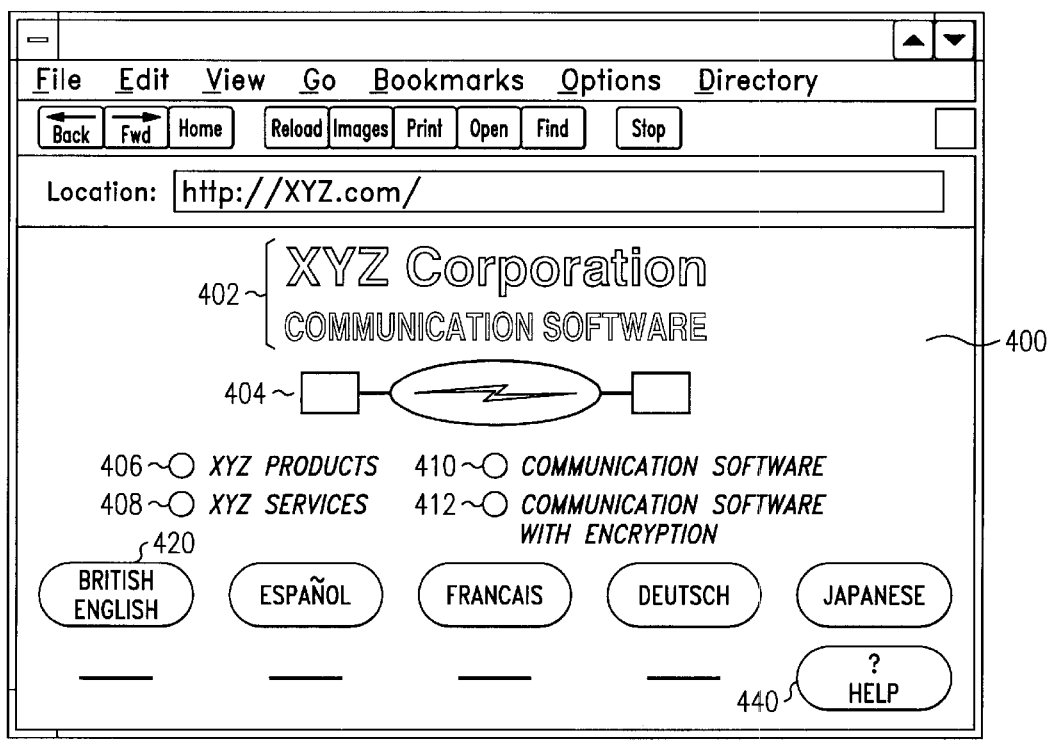
FIG. 4 shows a typical world wide web home page.

Referring now to FIG. 4, a representative home page 400 is shown as it would appear on the display (not shown) of client 30. The home page 400 is for the XYZ Corporation, which is a communications software company. The home page 400 has the company name 402 prominently displayed and an illustration 404 generally depicting the products and services provided. Home page 400 also has interactive links 406, 408, 410 and 412. Links 406 and 408 are to other pages having further information about communication products and services respectively. Links 410 and 412 lead to a sequence of files where user information including billing arrangements are made and an on-line transfer of the communications software is effected. Link 410 is for the downloading of a standard data communications software application. Link 412 is for a high security communications software application which has the capability of encrypting and decrypting communications according to most national and international encryption standards. Home page 400 is for users that are accessing the server 10 from within the country in which it is located. Since an on line transfer outside a country's border is as much of an export as exporting a disk bearing the same information and export of encryption software is regulated by law in the country in which server 10 is located, link 412 does not appear on international home pages corresponding to home page 400.

The home page 400 is in English because that is the dominant language of the country in which server 10 is located. At the bottom of home page 400 are interactive buttons 420–440, each of which is labeled with a different name of a language in that respective language. The user may select one of the interactive buttons 420–440 in order to change the display on the user's screen to that of a home page with the selected language, as shown in FIG. 5.

Figure 5:
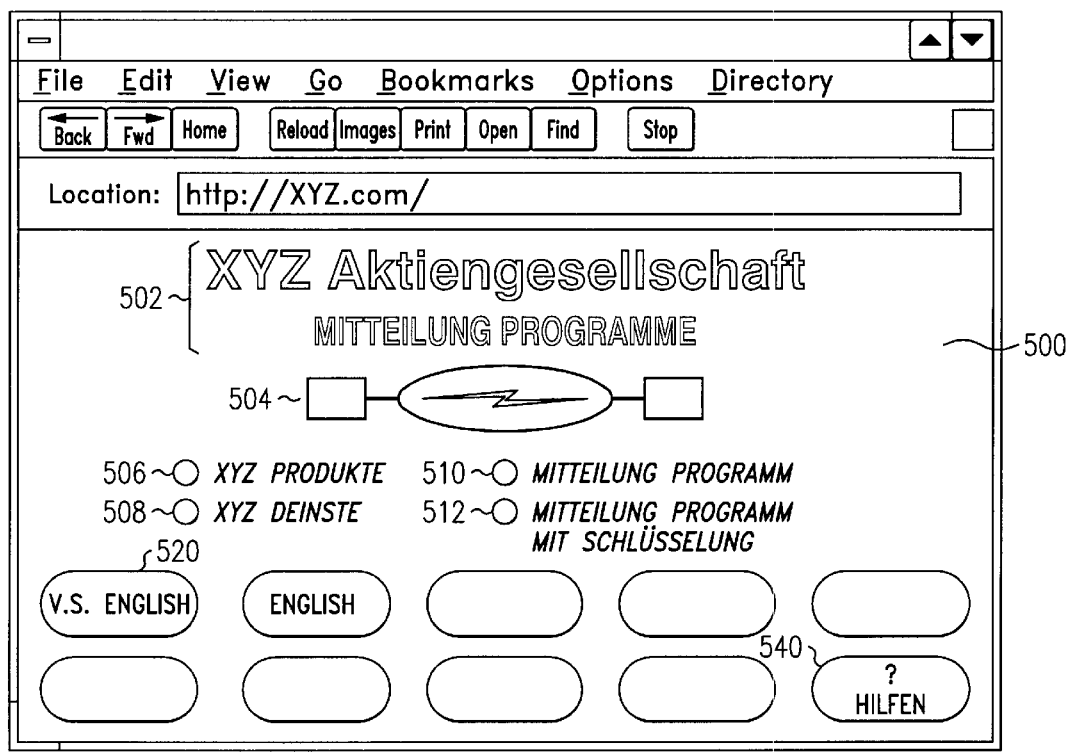
FIG. 5 shows an equivalent to the world wide web page in FIG. 4 only in a different language.

Referring now to FIG. 5, home page 500 is a German language equivalent to home page 400 for users located within the country in which server 10 is located. A user would access home page 500 the first time by entering "http://XYZ.COM" on the location or URL line of his or her web browser, receiving home page 400, and selecting button 424 labeled "DEUTSCH". Server 10 will store in a data base that this particular user, as identified by his or her address, prefers German (Deutsch) as the home page language and will automatically provide this particular user with German language home page 500 for subsequent accesses.

Figure 6:
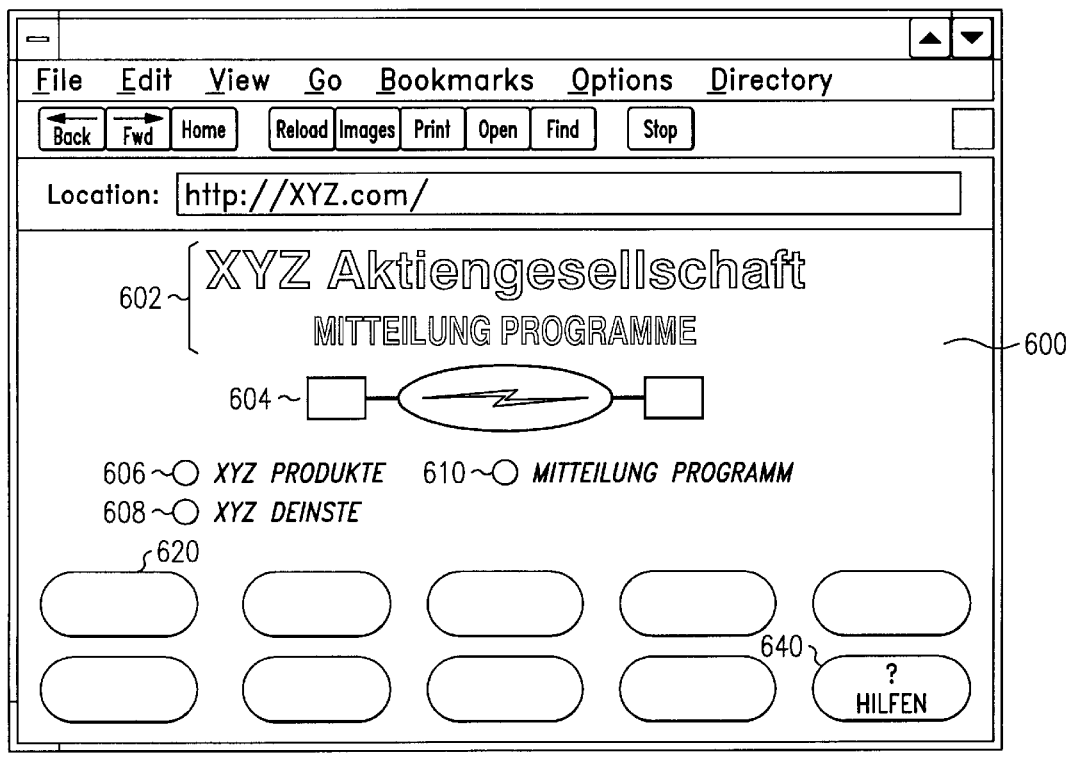
FIG. 6 shows an alternate world wide web page similar to FIG. 4, but with modified content to comply with national laws of the server and client countries.

Referring now to FIG. 6, home page 600 is similar to home pages 400 and 500, but has some important differences. Home page 600 is for accesses to server 10 made by international users of the world wide web, i.e. users outside the borders of the country in which server 10 is located. Since this is a transfer of technical data that requires an export license from the government of the location in which server 10 is located, the hyperlink to download the communication software with encryption and decryption capabilities has been removed for this home page, thereby preventing a violation of export laws by a download.

In Operation

The site administration prepares a version of the home page, and other pages associated therewith at the site, in each language which is to be made available to the customer base. These home pages are assigned distinct "permanent" URLs, and they contain links to other pages in the same language. Each of these home pages also contain a submittable form for requesting additional languages to be supported. All URLs are designed, and the server 10 is configured, so that each address (URL) that each client 30 presents to the server 10 in a request may have an optional identifying suffix. When the server 10 gets a page request using a URL that has such a suffix, it extracts the suffix, fetches the page for the URL without the suffix, and filters the page so as to add that same suffix to the URLs for all links on that page to pages at the site.

A single virtual home page URL is provided to all worldwide users as the main point of contact for the server 10. All the "permanent URL" home pages contain a link to this virtual URL.

Incoming requests for the single virtual home page URL are examined for a domain and optionally sub-domain of the requesting client, and this information is mapped by a fast database to a list of available languages that are ranked by expected probability of user preference at that domain and optionally sub-domain. There also is a default list of languages for unrecognized domain and sub-domain combinations so some home page is presented.

The server 10 composes a reply home page in the language which ranks highest in the probability list, inserting somewhere on the page an ordered array of links to the home page in alternative languages ranked from the next highest to the lowest in this list and also a link to the "permanent URL" version of the home page in the same language. The server 10 also generates a unique identifying suffix to be associated with this particular access to the virtual home page, and appends that key string to the URL for every link to a page at that site.

This, in combination with the suffix tracking, permits the server 10 to identify all accesses that follow from the initial client browser session that requested the virtual home page. Each of the links to the alternative languages is displayed as an instance of one or two joined language names, a first name being expressed in the associated language and a second name expressed in the language of the reply page if the spelling is different. For example, a Spanish page might show [English (Ingles)] as an alternative, an English page might show [Francais (French)] as an alternative, and an American English page might show [British English] as an alternative. The link to the "permanent URL" version of the home page in the same language is displayed as language name as expressed in the associated language, together with a note that the user should bookmark that link to ensure reaching a home page in the future which will always be in the currently used language.

The server 10 keeps a history of page accesses with associated requesting client IP addresses and browser session identification. This history is periodically tallied to rank the actual language preferences associated with the requesting client subdomains and domains. This is determined by noting what alternate language or languages, or none, were traversed to from the virtual home page by each browser session that accessed it. This ranking information is used to automatically revise the order of the language lists in the mapping database and to optionally add subdomains to refine the language coverage.

While the invention has been particularly illustrated and described with reference to preferred embodiments thereof, it will be understood by those skilled in the art that various changes in form, details, and applications may be made therein. For example, other forms of addressing as long as they can be mapped to country or language locations may be used in Internet accesses. It is accordingly intended that the appended claims shall cover all such changes in form, details and applications which do not depart from the true spirit and scope of the invention.

What is claimed as new and desired to be secured by Letters Patent of the United States is:

1. A computer system having a data communications interface connected to the internet and operating as a server comprising:

storage means for storing a plurality of initial displays of said server, with each of said plurality of initial displays being in one of a plurality of languages;

means for reading a location code from each user's domain designation; and means for selecting an initial display of said plurality of initial displays that is in one of said languages that corresponds to the dominant language for the location indicated by the location code from each user's domain designation.

2. The computer system as set forth in claim 1, wherein said computer system is a server communicating by hypertext transfer protocol to a client providing said initial display for viewing by at least one user.

3. The computer system as set forth in claim 2, wherein said plurality of initial displays are a plurality of world wide web home pages with each of said home pages showing text in a different language.

4. The computer system as set forth in claim 3, wherein each of said plurality of world wide web pages is varied in appearance and content to comport with the laws of the nation in which each respective client is located.

5. The computer system as set forth in claim 3, wherein each of said plurality of world wide web pages is varied in appearance and content to comport with the laws of the nation in which said server is located for exporting information to the country in which said client is located.

6. A computer system having a data communications interface connected to the internet and operating as a server comprising:

storage means for storing a plurality of initial displays of said server, with each of said plurality of initial displays being in one of a plurality of languages;

means for reading a location code from each user's node address; and means for selecting an initial display of said plurality of initial displays that is in one of said languages that corresponds to the dominant language for the location indicated by the location code from each user's node address.

7. The computer system as set forth in claim 6, wherein said computer system is a server communicating by hypertext transfer protocol to a client providing said selected initial display for viewing by at least one user.

8. The computer system as set forth in claim 7, wherein said plurality of initial displays are a plurality of world wide web home pages with each of said home pages showing text in a different language.

9. The computer system as set forth in claim 8, wherein each of said plurality of world wide web pages is similar in appearance and content, with the major difference being the language of the text appearing on each world wide web page.

10. The computer system as set forth in claim 8, wherein each of said plurality of world wide web pages is varied in appearance and content to comport with the laws and customs of the nation in which each client is located.

11. The computer system as set forth in claim 8, wherein each of said plurality of world wide web pages is varied in appearance and content to comport with the laws of the nation in which said server is located for exporting information to the country in which said client is located.

12. A computer system having a data communications interface connected to the internet and operating as a server comprising:

computer storage storing a plurality of initial displays of the server, with each of said plurality of initial displays being in one of a plurality of languages;

a processor receiving a location code from each user's internet domain designation by said data communications interface; and said processor selecting an initial display of said plurality of initial displays that is in one of said languages that corresponds to the dominant language for the location indicated by the location code from each user's domain designation.

13. The computer system as set forth in claim 12, wherein said computer system is a server communicating by hypertext transfer protocol to a client providing said initial display for viewing by a plurality of users.

14. The computer system as set forth in claim 13, wherein said plurality of initial displays are a plurality of world wide web home pages with each of said home pages showing text in a different language.

15. The computer system as set forth in claim 14, wherein each of said plurality of world wide web pages is varied in appearance and content to comport with the laws of the nation in which each respective client is located.

16. The computer system as set forth in claim 14, wherein each of said plurality of world wide web pages is varied in appearance and content to comport with export laws of the nation in which said server is located for exporting information to the country in which said client is located.

17. The computer system as set forth in claim 14, wherein each of said plurality of world wide web pages is varied in appearance and content to comport with copyright laws of the nation in which said server is located for exporting copyrighted information to the country in which said client is located.

18. The computer system as set forth in claim 14, wherein each of said plurality of world wide web pages is varied in appearance and content to comport with encryption limitation laws of the nation in which said server is located for exporting information to the country in which said client is located.

19. The computer system as set forth in claim 14, wherein each of said plurality of world wide web pages is varied in appearance and content to comport with pornography laws of the nation in which said client is located.

20. The computer system as set forth in claim 14, wherein each of said plurality of world wide web pages is varied in appearance and content to comport with the tobacco regulation laws of the nation in which said client is located.

21. The computer system as set forth in claim 14, wherein each of said plurality of world wide web pages is varied in appearance and content to comport with the drug regulation laws of the nation in which said client is located.

22. A computer system having a data communications interface connected to the internet and operating as a server comprising:

computer storage storing a plurality of initial displays of the server, with each of said plurality of initial displays being in one of a plurality of languages;

a processor receiving a location code from each user's node address; and said processor selecting an initial display of said plurality of initial displays that is in one of said languages that corresponds to the dominant language for the location indicated by the location code from each user's node address.

23. The computer system as set forth in claim 22, wherein said computer system is a server communicating by hypertext transfer protocol to a client providing said initial display for viewing by a plurality of users.

24. The computer system as set forth in claim 23, wherein said plurality of initial displays are a plurality of world wide web home pages with each of said home pages showing text in a different language.

25. The computer system as set forth in claim 24, wherein each of said plurality of world wide web pages is varied in appearance and content to comport with the laws of the nation in which each respective client is located.

26. The computer system as set forth in claim 24, wherein each of said plurality of world wide web pages is varied in appearance and content to comport with export laws of the nation in which said server is located for exporting information to the country in which said client is located.

27. The computer system as set forth in claim 24, wherein each of said plurality of world wide web pages is varied in appearance and content to comport with copyright laws of the nation in which said server is located for exporting copyrighted information to the country in which said client is located.

28. The computer system as set forth in claim 24, wherein each of said plurality of world wide web pages is varied in appearance and content to comport with encryption limitation laws of the nation in which said server is located for exporting information to the country in which said client is located.

29. The computer system as set forth in claim 24, wherein each of said plurality of world wide web pages is varied in appearance and content to comport with pornography laws of the nation in which said client is located.

30. The computer system as set forth in claim 24, wherein each of said plurality of world wide web pages is varied in appearance and content to comport with tobacco regulation laws of the nation in which said client is located.

31. The computer system as set forth in claim 24, wherein each of said plurality of world wide web pages is varied in appearance and content to comport with drug regulation laws of the nation in which said client is located.

32. The computer system as set forth in claim 24, wherein each of said plurality of world wide web pages is varied in appearance and content to comport with national official language laws of the nation in which said client is located.

* * * * *